Patented Dec. 4, 1945

2,390,202

UNITED STATES PATENT OFFICE 2,390,202

SYNTHETIC DRYING OILS

Harry Burrell, Paramus, N. J., and Philip I. Bowman, Syracuse, N. Y., assignors, by mesne assignments, to Heyden Chemical Corporation, New York, N. Y., a corporation of Delaware No Drawing. Application January 31, 1941, Serial No. 376,840

12 Claims. (Cl. 260—410.6)

This invention relates to unsaturated fatty acid esters of polypentaerythritols.

It is an object of this invention to prepare new compositions of matter which are useful as drying oils, and especially in that class known as stand oils. It is a further object to provide substances that are suitable for use in the formulation and manufacture of varnishes, enamels, paints, lacquers, vehicles, and other coating compositions, printing and lithographic inks, linoleum, oil cloth, patent leather, linoxyn, putty, core oils, and related products. Other objects and advantages of the invention appear hereinafter.

The preparation of esters of drying oil fatty acids and polyhydric alcohols is well known in the art. In particular, Arvin U. S. Patent Number 2,029,851 discloses the preparation of such esters of pentaerythritol. It has also been well recognized that the esters of alcohols more polyhydric than glycerol dry at a faster rate than the natural (glyceride) drying oils. The products of this invention possess a superior drying power over natural drying oils. Investigation has proved this to be a fact; while we do not claim these products to be new and novel by virtue of their increased drying rate, we wish to point out that this quality adds to the advantages accruing from the use of said products and, when considered as augmenting the new and unexpected features presently to be mentioned, the resulting combined advantages render the new drying oils extremely desirable.

In the manufacture of pentaerythritol by the condensation of acetaldehyde and formaldehyde, in addition to the pentaerythritol itself, smaller amounts of related hydroxylated substances are also obtained. One of these, which is obtained in a considerable amount, is dipentaerythritol, which is an ether having the following structure:

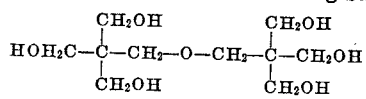

(see Brün, "Ueber den Dipentaerythrit," Wilhelm Greven, Krefeld, 1930). Another hydroxylated substance, which is obtained in somewhat smaller amounts, is white and crystalline, melts at 230–240° C. and has a hydroxyl content of 33%. It is related to dipentaerythritol in that it contains pentaerythritol residues bound by ether linkages. Regardless of chemical structure, for purposes of definition in this specification and in the claims, this substance will be termed "pleopentaerythritol."

Pleopentaerythritol is a mixture composed primarily of dipentaerythritol and tripentaerythritol together with a minor amount of other compounds, which, according to the best evidence available, includes other related alcohols. It is the residue remaining after the separation of pentaerythritol and the major portion of the dipentaerythritol from the reaction product resulting from the condensation of formaldehyde and acetaldehyde in the presence of an alkali.

Dipentaerythritol, tripentaerythritol, and pleopentaerythritol are referred to herein and in the claims as "polypentaerythritols." Such compounds are formed by etherification of one or more of the hydroxyl radicals of pentaerythritol by other pentaerythritol residues.

The unsaturated monocarboxylic fatty acid esters of these polypentaerythritols, which are disclosed in this specification, so far as is known, have not been heretofore described in the literature.

The fact that these alcohols are more polyhydric than pentaerythritol, would lead one to expect that their esters with drying oil acids would have a faster drying rate than the corresponding pentaerythritol esters. Indeed, inasmuch as dipentaerythritol is a hexahydric alcohol, whereas pentaerythritol is only tetrahydric, and considering the fact that pentaerythritol esters dry much more rapidly than glycerol esters, one would predict that the dipentaerythritol ester would dry a great deal faster than the pentaerythritol ester. It is an entirely unexpected result, therefore, that there is substantially little or no difference between the drying times of the dipentaerythritol and higher polypentaerythritol esters and the pentaerythritol esters. This fact is illustrated by the results disclosed in the table hereinafter that is included in Example 11.

Instead of the difference between pentaerythritol and polypentaerythritol esters being manifested in the drying time, strangely enough this difference between the respective esters appears in their viscosities, the polypentaerythritol esters having a much greater viscosity. Esters of drying oil fatty acids and polypentaerythritols either possess a high viscosity as formed, or can be easily and quickly heat bodied to products equivalent to ordinary stand oils produced only by prolonged and relatively expensive heat treatment.

Stand oils are widely used in the production of enamels, patent leather, printing inks and kindred products. The products of this invention are especially suitable for such uses. In addition, their high viscosities permit the use of a greater proportion of thinner for the preparation of ordinary paint products, while still maintaining the correct brushing consistency. Mixtures may be made with other oils to control and alter the viscosity while maintaining a prescribed heating time or temperature schedule during a given processing treatment. The products of the present invention may be cooked with resins to produce varnishes, or combined with a variety of other materials.

In bodying previously known drying oils by heat, the acid number invariably increases with the time of heat treatment, frequently reaching values which prohibit the use of the resulting product with basic pigments such as zinc oxide. The stand oils of this invention may be used to obtain desired viscosities without the development of prohibitive acid numbers, inasmuch as processing times are reduced to a minimum or else entirely dispensed with.

From an economic standpoint, processing costs with the products of this invention are considerably less than the cost of producing an equivalent product from oils heretofore known. Bodying may either be dispensed with or may be accomplished at lower temperatures or in a shorter time with consequent saving in heat and/or investment. Varnish bases, for instance, may be cooked more rapidly.

The esters of fatty acids and polypentaerythritols of the present invention may be prepared by heating together the fatty acid and the polyhydric alcohol, either alone or in the presence of one of the following:

(a) An inert gas, such as carbon dioxide, which serves to exclude oxygen which might promote premature bodying or gelation.
(b) An esterification catalyst, such as lead oxide or sulfuric acid.
(c) An inert solvent, preferably one which is high boiling and which forms a lower boiling azeotrope with water.

The preferred method is to use an azeotropic solvent, since this produces a rapid reduction of the acid number of the reaction mixture by removing the water of esterification. In addition, the solvent vapors provide an oxygen-excluding atmosphere and the color of the resulting drying oils is lighter than can be obtained by using the other methods specified hereinabove. Suitable inert solvents include triisopropyl benzenes (either individuals or mixtures of isomers), diethyl benzenes, diisopropyl benzenes, or petroleum fractions having a boiling range from approximately 180° C. to 250° C. Other solvents having boiling points near this range may be used. Undesired solvent remaining with the drying oil product after the reaction is complete may be removed by any suitable means, conveniently by vacuum distillation.

Temperatures for the esterification reaction should be above 200° C. and may be as high as 350° C. The time required may vary, depending on apparatus used, size of batch, temperature, etc., but for most purposes the reaction should be continued until the acid number of the product is 10 or less. Completion of the reaction may also be judged by measuring the water of esterification evolved. Reactant proportions may be calculated by determining the acid number of the fatty acid and the hydroxyl value of the polypentaerythritol by conventional analytical procedures. The desired esters are the complete esters, that is to say, esters in which substantially all the hydroxyl groups of the reacting alcohol have been esterified. Stoichiometric proportions may be used, or a slight excess, say 1 or 2 per cent., of polyhydric alcohol may be used. Mixtures of fatty acids may be used; for example, soy bean oil acids and tung oil acids may be mixed and the mixtures esterified with a polypentaerythritol. Mixtures of alcohols may be used, such as, for example, pentaerythritol and dipentaerythritol, or glycerol and pleopentaerythritol. Usually the viscosity or bodying rate of esters produced from such mixtures of polyhydric alcohols will be intermediate between the viscosities or bodying rates of the corresponding esters of the individual alcohols. A convenient mixture of polyhydric alcohols to use is one which contains approximately 20% to 30% dipentaerythritol and 80% to 70% pentaerythritol. These proportions approximate the ratio in which the two alcohols may be produced in the pentaerythritol reaction.

Unsaturated, long-carbon-chain fatty acids of all types may be used for the production of the synthetic drying oils of the invention. Such acids include linoleic, linolenic, oleic, eleostearic, clupanodonic, licanic, dehydrated ricinoleic, or other unsaturated $C_{12}$ to $C_{22}$ acids, or mixtures of these with other acids, such as may occur in products resulting from the saponification of natural oils. Fatty acids which have been specially treated to increase their unsaturation or to increase the degree of conjugation of the double bonds may also be used.

The following examples illustrate methods of preparing and using the products of the invention and should not be so construed as to limit the scope of the invention since modifications will readily suggest themselves to one skilled in the art. Parts specified are by weight.

*Example 1.*—Four hundred (400) parts of linseed oil fatty acids having an acid number of 193, 58 parts of dipentaerythritol, and 150 parts of mixed diisopropyl benzene isomers were heated up to 325° C. in 3.25 hours, allowing the diisopropyl benzenes and water to distill off. The reaction mixture was continuously stirred during the period of heating. After cooling, 422 parts of a brown oil having a viscosity of about 7 poises and a color of 13 on the Gardner scale were obtained.

*Example 2.*—Five hundred (500) parts of linseed oil fatty acids having an acid number of 198 and 91 parts of dipentaerythritol were heated in an apparatus which allowed continuous stirring while passing in a slow stream of carbon dioxide. The reaction mixture was heated to 250° C. in 1.5 hours and held at this temperature for 10.2 hours when a medium-brown-colored, viscous oil having an acid number of 9.4 was obtained.

*Example 3.*—Four hundred (400) parts of linseed oil acids having an acid number of 193, 71 parts of pleopentaerythritol and 100 parts of diisopropyl benzenes were heated up to 315° C. in 1 hour and 50 minutes, at which time the theoretical amount of water (24.6 parts) had distilled off. The product, when cooled to room temperature, was a brownish-green oil having a viscosity of 4 poises and a color of 12 on the Gardner scale. The viscosity of the product increased to 74 poises (measured at room temperature) when heated at 250° C. for 1 hour.

*Example 4.*—Four hundred (400) parts of soy bean oil fatty acids having an acid number of 206, 62.1 parts of dipentaerythritol, and 120 parts of a petroleum solvent naphtha having the following constants:

| | | |
|---|---|---|
| Flash point | °F | 143 |
| Specific gravity | | 0.804 |
| API gravity | | 44.5 |
| Aniline point | °C | 60.5 |
| Boiling range | °C | 188-213 | were heated with continuous stirring at 300-310° C. for 3 hours, allowing the petroleum fraction and the water to distill off. The product was a very viscous oil which had a color of 10 (Gardner).

*Example 5.*—Four hundred (400) parts of soy bean oil fatty acids having an acid number of 206, 76 parts of pleopentaerythritol, and 100 parts of diisopropyl benzenes were heated up to 320° C. in 2 hours and 20 minutes, when the theoretical quantity of water (26.5 parts) had distilled off. The product was a viscous oil having an acid number of 7.75 and a color of 5 (Gardner).

*Example 6.*—Four hundred (400) parts of linseed oil fatty acids having an acid number of 193, 34.7 parts of pentaerythritol, 14.8 parts of dipentaerythritol, and 120 parts of diisopropyl benzenes were reacted by heating the mixture up to 325° C. in 2.25 hours. Four hundred and twenty-seven (427) parts of an oil having a viscosity of 6.27 poises and a color of 12 (Gardner) were obtained. A portion of this oil was bodied by a short heat treatment to a viscosity of 482 poises.

*Example 7.*—Example 6 was repeated, using 25.9 parts each of pentaerythritol and dipentaerythritol and heating up to 333° C. in 1 hour and 5 minutes. The resulting oil had a viscosity of 3.70 poises and a Gardner color of 13.

*Example 8.*—Four hundred and fifty (450) parts of soy bean oil fatty acids having an acid number of 206, 150 parts of tung oil acids having an acid number of 191, and 79 parts of a mixture containing 76% pentaerythritol and 24% dipentaerythritol were reacted in the presence of 80 parts of the petroleum naphtha specified in Example 4. The heating cycle consisted of raising the temperature to 260° C. in 1 hour and 10 minutes, holding this temperature for 2 hours and 5 minutes, then raising the temperature to 302° C. in 37 minutes and allowing the product to cool. The product was a light-colored, very viscous oil.

*Example 9.*—Three hundred and fifty (350) parts of fish oil acids, which had been fractionally distilled so as to remove part of the saturated acids and which had an acid number of 175, were reacted with 40 parts of a mixture containing 24% dipentaerythritol and balance pentaerythritol in the presence of 40 parts of the petroleum solvent specified in Example 4. The reaction conditions were to heat the mixture to 290° C. in 2 hours and 10 minutes. The product was a light-colored, highly viscous oil having only a slight odor.

*Example 10.*—Six hundred (600) parts of distilled dehydrated castor oil fatty acids having an acid number of 199, 78.3 parts of a mixture containing 24% dipentaerythritol and balance pentaerythritol, and 40 parts of the petroleum solvent naphtha specified in Example 4 were heated together in an apparatus in which the mixture was continuously stirred and from which the azeotropic vapors could be condensed, the water separated out and measured, and the petroleum distillate returned to the reaction mixture. The reaction mixture was heated to 309° C. in 2 hours and 25 minutes, at which time slightly more than the theoretical amount of water had separated. After reaching 309° C. the product was cooled slightly and then a vacuum was applied to the apparatus while cooling continued, so that the last traces of inert solvent might be removed.

*Example 11.*—Twenty-five-gallon varnishes were prepared with the drying oils described in the foregoing examples, using a Congo copal resin which had been run as prescribed by the American Gum Importers' Association. The varnish bases were cooked at 275° C. for the indicated bodying times; they were thinned with an equal quantity of "Varsol No. 1" and 0.3% lead, 0.03% cobalt and 0.03% manganese naphthenate driers were added.

An ester of pentaerythritol and linseed oil fatty acids was prepared by the procedure described in Example 1, the oil having a final viscosity of 1.40 poises. This product is included in the data tabulated hereinafter for comparative purposes, as is also a corresponding ester of pentaerythritol and soy bean oil acids.

The following table shows the times required to body the various varnishes prepared as described and their respective drying times, as determined by the finger-tip method on drained films on glass plates.

| Varnish designation | Drying oil used | Bodying time | Drying time | |
|---|---|---|---|---|
| | | | Dust-free | Tack-free |
| | | Minutes | Hours | Hours |
| A | Pentaerythritol ester of linseed oil acids | 80 | 1 | 3 |
| B | 30%-Dipentaerythritol ester of linseed oil acids (Example 6) | 57 | 1½ | 4¼ |
| C | 50%-Dipentaerythritol ester of linseed oil acids (Example 7) | 55 | 1½ | 4 |
| D | Dipentaerythritol ester of linseed oil acids (Example 1) | 45 | 1¼ | 3 |
| E | Pleopentaerythritol ester of linseed oil fatty acids (Example 3) | 32 | 2 | 4 |
| F | Pentaerythritol ester of soy bean oil acids | 370 | 4 | 9 |
| G | Dipentaerythritol ester of soy bean oil acids (Example 4) | 45 | 4 | 10 |
| H | Pleopentaerythritol ester of soy bean oil acids (Example 5) | 70 | 4 | 7 |
| I | 24% Dipentaerythritol ester of soy bean-tung oil acids mixture (Example 8) | 120 | 4 | 8 |
| J | 24% Dipentaerythritol ester of dehydrated castor oil fatty acids (Example 10) | 80 | 2 | 7 |
| K | 24% Dipentaerythritol ester of fish oil acids (Example 9) | 35 | 2 | 5 |

Similar formulations with run Kauri gum produce substantially the same results.

It may readily be seen from the examples, that, although within a given acid ester series there is little difference in drying times between pentaerythritol and polypentaerythritol esters, there is an enormous difference in bodying rates. Thus, in the linseed oil acid ester series, the bodying time of the dipentaerythritol ester is 56%, and that of the pleopentaerythritol ester is only 40% of the pentaerythritol rate. In the soy bean oil acid ester series, the difference is even more striking: the corresponding percentages are dipentaerythritol 12% and pleopentaerythritol 19%. Other drying oil acid esters are correspondingly quick bodying.

It is also evident that only a small percentage of polypentaerythritol need be mixed with another polyhydric alcohol to increase the bodying rate greatly. It is not necessary to actually mix the polyhydric alcohols before esterifying a given unsaturated acid, but the esters of the polypentaerythritols may be mechanically mixed with other esters to produce the same benefit in bodying time.

There is also greater hardness of film when using the polypentaerythritols than is obtained when using pentaerythritol. The Sward hardness of dried films of several oils is given below, the numerical values of hardness being based on plate glass=100.

Sward hardness

Linseed oil fatty acid esters of:
1. Pentaerythritol _____ 4
2. Dipentaerythritol (Example 1) _____ 8
3. Pleopentaerythritol (Example 3) _____ 10

Soy bean oil fatty acid esters of:
4. Pentaerythritol _____ 4
5. Pleopentaerythritol (Example 5) _____ 6

The products of this invention provide a valuable adjunct to coatings and kindred formulations because they allow rapid and economical production of highly viscous products including stand oils.

Having thus described our invention, what we claim as new and desire to secure by Letters Patent is:

1. A synthetic drying oil consisting essentially of a polypentaerythritol selected from the group consisting of dipentaerythritol, tripentaerythritol and mixtures thereof fully esterified with an unsaturated monocarboxylic higher fatty acid.

2. A synthetic drying oil consisting of a polypentaerythritol selected from the group consisting of dipentaerythritol, tripentaerythritol and mixtures thereof fully esterified with a higher monobasic aliphatic carboxylic acid mixture having a substantial content of polyunsaturated acids.

3. A synthetic drying oil consisting of a polypentaerythritol selected from the group consisting of dipentaerythritol, tripentaerythritol and mixtures thereof fully esterified with the fatty acids of an oil selected from the group consisting of drying and semi-drying oils.

4. A synthetic drying oil consisting of a polypentaerythritol selected from the group consisting of dipentaerythritol, tripentaerythritol and mixtures thereof fully esterified with linseed oil fatty acids.

5. A synthetic drying oil consisting of a polypentaerythritol selected from the group consisting of dipentaerythritol tripentaerythritol and mixtures thereof fully esterified with soya bean oil fatty acids.

6. A synthetic drying oil consisting of a polypentaerythritol selected from the group consisting of dipentaerythritol, tripentaerythritol and mixtures thereof fully esterified with the acids of dehydrated castor oil.

7. A synthetic drying oil consisting of dipentaerythritol fully esterified with an unsaturated monocarboxylic higher fatty acid.

8. A synthetic drying oil consisting of dipentaerythritol fully esterified with a higher monobasic aliphatic carboxylic acid mixture having a substantial content of higher polyunsaturated monobasic aliphatic carboxylic acids.

9. A synthetic drying oil consisting of dipentaerythritol fully esterified with the fatty acids of an oil selected from the group consisting of drying and semi-drying oils.

10. A synthetic drying oil consisting of dipentaerythritol fully esterified with linseed oil fatty acids.

11. A synthetic drying oil consisting of dipentaerythritol fully esterified with soya bean oil fatty acids.

12. A synthetic drying oil consisting of dipentaerythritol fully esterified with the acids of dehydrated castor oil.

HARRY BURRELL.
PHILIP I. BOWMAN.